(12) United States Patent
Swadling et al.

(10) Patent No.: US 11,204,806 B2
(45) Date of Patent: Dec. 21, 2021

(54) SYSTEMS AND METHODS FOR USER ADAPTIVE RESOURCE MANAGEMENT

(71) Applicant: Apple Inc., Cupertino, CA (US)

(72) Inventors: Maxwell Shane Swadling, Coffs Harbour (AU); Morgan Winer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 16/220,811

(22) Filed: Dec. 14, 2018

(65) Prior Publication Data

US 2019/0370069 A1    Dec. 5, 2019

Related U.S. Application Data

(60) Provisional application No. 62/679,880, filed on Jun. 3, 2018.

(51) Int. Cl.
  *G06F 9/46* (2006.01)
  *G06F 9/50* (2006.01)
  (Continued)

(52) U.S. Cl.
  CPC .......... *G06F 9/5016* (2013.01); *G06F 9/4451* (2013.01); *G06F 9/5022* (2013.01); *G06N 20/00* (2019.01)

(58) Field of Classification Search
  CPC .... G06F 9/5016; G06F 9/5022; G06F 9/5055; G06F 9/4451; G06F 9/485; G06F 11/302;
  (Continued)

(56) References Cited

U.S. PATENT DOCUMENTS

| | | |
|---|---|---|
| 5,483,261 A | 1/1996 | Yasutake |
| 5,488,204 A | 1/1996 | Mead et al. |
| (Continued) | | |

FOREIGN PATENT DOCUMENTS

| | | |
|---|---|---|
| EP | 1421772 A2 | 5/2004 |
| JP | 2000-163031 A | 6/2000 |
| JP | 2002-342033 A | 11/2002 |

OTHER PUBLICATIONS

Aponso, G.C.A.L. (2017). "Effective Memory Management for Mobile operating Systems," American Journal of Engineering Research (AJER), e-ISSN: 2320-0847 p-ISSN : 2320-0936, vol. 6, Issue—1, pp. 245-248, located at: www.ajer.org, four pages.

(Continued)

*Primary Examiner* — Charles M Swift
*Assistant Examiner* — Zhi Chen
(74) *Attorney, Agent, or Firm* — Kubota & Basol LLP

(57) ABSTRACT

User adaptive memory management can improve the user experience by allowing an electronic device including a data processing system to efficiently, proactively, and selectively allocate memory resources (particularly to keep or release large resources in memory), which improves application launch times for some applications and reduces or prevents delays from loading resources into memory for system services. User adaptive memory management can track past use of one or more applications and/or one or more system services (requiring one or more resources) by one or more users. Heuristics can be used to determine when to keep resources in memory and when to release resources in an adaptive way to improve user performance for launching applications (or other memory intensive operations) and for using system services with large resources without delays induced by reactive memory management of resources.

25 Claims, 6 Drawing Sheets

(51) Int. Cl.
    *G06N 20/00*    (2019.01)
    *G06F 9/445*    (2018.01)

(58) Field of Classification Search
    CPC ............. G06F 11/3017; G06F 11/3037; G06F 11/3051; G06F 11/3419; G06F 11/3433; G06F 11/3452; G06F 11/3442; G06F 2209/503; G06F 2209/504; G06F 2209/482; G06N 20/00
    See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,389,515 | B1 | 6/2008 | Seth et al. |
| 7,663,607 | B2 | 2/2010 | Hotelling et al. |
| 8,479,122 | B2 | 7/2013 | Hotelling et al. |
| 8,635,590 | B1 | 1/2014 | Ogilvie |
| 10,452,440 | B1* | 10/2019 | Odulinski ............... G06F 9/485 |
| 2005/0034129 | A1* | 2/2005 | Chew .................. G06F 9/44594 718/100 |
| 2005/0210419 | A1* | 9/2005 | Kela ..................... G06F 1/1626 715/863 |
| 2006/0197753 | A1 | 9/2006 | Hotelling |
| 2008/0005736 | A1 | 1/2008 | Apacible et al. |
| 2008/0056269 | A1* | 3/2008 | Madhani ........... H04L 29/12122 370/395.2 |
| 2008/0155386 | A1* | 6/2008 | Jensen ................... H04L 69/40 715/201 |
| 2011/0241985 | A1* | 10/2011 | Hill ...................... G06F 3/1454 345/157 |
| 2014/0143791 | A1* | 5/2014 | Mark .................... H04W 4/027 719/318 |
| 2014/0366041 | A1* | 12/2014 | Stanley-Marbell ... G06F 9/4825 719/318 |
| 2015/0074106 | A1* | 3/2015 | Ji ........................... G06F 9/543 707/736 |
| 2015/0324119 | A1 | 11/2015 | Romanovsky et al. |
| 2016/0132119 | A1* | 5/2016 | Temple ............... G06F 3/04883 345/168 |
| 2016/0378447 | A1* | 12/2016 | Nandakumar .......... G06F 21/00 717/108 |
| 2017/0235606 | A1* | 8/2017 | Cherniavsky ......... G06F 9/5011 718/104 |
| 2018/0024905 | A1* | 1/2018 | Kitajima ............. G06F 11/3423 702/186 |
| 2018/0129537 | A1* | 5/2018 | Kurtzman ............. G06F 9/5083 |
| 2018/0341336 | A1* | 11/2018 | Norrbom ............... G09B 13/04 |
| 2019/0109949 | A1* | 4/2019 | Seetharaman .... H04M 15/8228 |
| 2019/0347113 | A1* | 11/2019 | Ma ........................ G06F 9/4818 |
| 2019/0354252 | A1* | 11/2019 | Badr .................... G06F 3/0484 |
| 2019/0373675 | A1* | 12/2019 | Chari ................... H04W 16/26 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

SYSTEMS AND METHODS FOR USER ADAPTIVE RESOURCE MANAGEMENT

CROSS REFERENCE TO RELATED APPLICATIONS

This application claims benefit of U.S. Provisional Patent Application No. 62/679,880, filed Jun. 3, 2018, the entire disclosure of which is incorporated herein by reference for all purposes.

FIELD OF THE DISCLOSURE

This disclosure relates generally to memory management in data processing systems such as computers, smart phones, etc., and more particularly to adaptive resource management.

BACKGROUND OF THE DISCLOSURE

An operating system is a collection of software that manages device hardware resources and provides common services for computer programs. The operating system is a vital component of the system software in a device. The system software manages and integrates a computer's capabilities. The system software includes the operating system, utility software, device drivers, and other software tools. Application software can be considered to be the computer software that causes a computer to perform useful tasks in response to user requests. A specific instance of application software is called a software application, application program, application or app, which are used interchangeably below. Application programs usually require an operating system to function.

As more and more services are becoming available for small or mobile devices, the number of applications running in a single device has increased significantly. Usually, a mobile device is used mostly for certain specific applications, while being equipped with general purpose computing capabilities. For example, it is common to find a mobile phone that also runs a browser application, a gaming application, and a media player application, etc. On the other hand, a mobile video player device may run a gaming application and/or an email application in addition to a video application. Multiple applications or processes in the same device compete with each other by sharing the same memory resources and computation resources embedded inside the device. The memory capacity for small and mobile devices (e.g., DRAM) is often much smaller than the memory capacity for larger devices such as desktop and laptop computers. Despite these memory constraints, small and mobile devices are increasingly expected to run applications and system services with large memory requirements. The operating system performs resource/memory management to deal with resource contention.

These applications or processes consume resources of the device, such as central processing units (CPUs), memory, input/output, etc. When two or more applications are running at the same time, the competition for the resources of the device can result in user interface glitches, the device feeling sluggish, slow response to touches or other inputs, and/or the device locking up if there are insufficient resources available to be applied to the applications. In particular, the launching by a user of the newly launched application can appear to be sluggish to the user. For example, an application such as gaming application may temporarily require a large amount of memory to launch. If such a large amount of memory exceeds the available memory, the application loading may be delayed until such memory can be acquired.

SUMMARY

Described herein are systems and methods for user adaptive memory management. User adaptive memory management can improve the user experience by allowing an electronic device including a data processing system to efficiently, proactively, and selectively allocate memory resources (particularly to keep or release large resources in memory), which improves application launch times for some applications and reduces or prevents delays from loading resources into memory for system services. User adaptive memory management can track past use of one or more applications and/or one or more system services (requiring one or more resources) by one or more users. Heuristics can be used to determine when to keep resources in memory and when to release resources in an adaptive way to improve user performance for launching applications (or other memory intensive operations) and for using system services with large resources without delays induced by reactive memory management of resources. For example, one or more parameters indicative of past usage of the application (e.g., average session duration) within a time period and/or of past usage of a resource (e.g., percentage usage of a system service with a resource) by the application within the time period can be tracked. In response to receiving a request to launch the application, in accordance with a determination that the one or more parameters satisfy one or more criteria, the resource in memory can be released. In response to receiving a request to launch the application, in accordance with a determination that the one or more parameters associated with the application fail to satisfy the one or more criteria the resource in memory can be kept. In some examples, the system service can be a keyboard and its resource can be a machine learning model for autocorrect, predictive text entry, etc.

DETAILED DESCRIPTION

Figure 1A:
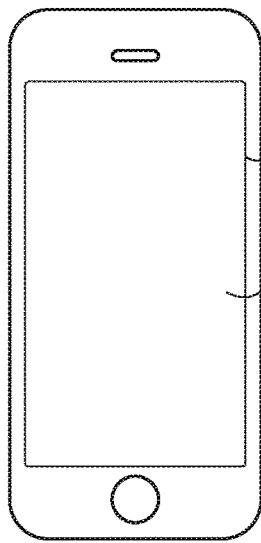
FIGS. 1A-1E illustrate exemplary systems, optionally including touch screens, that can perform user adaptive resource management according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

In particular, in the following description of various techniques and process flow steps, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps may be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Described herein are systems and methods for user adaptive memory management. User adaptive memory management can improve the user experience by allowing an electronic device including a data processing system to efficiently, proactively, and selectively allocate memory resources (particularly to keep or release large resources in memory), which improves application launch times for some applications and reduces or prevents delays from loading resources into memory for system services. User adaptive memory management can track past use of one or more applications and/or one or more system services (requiring one or more resources) by one or more users. Heuristics can be used to determine when to keep resources in memory and when to release resources in an adaptive way to improve user performance for launching applications (or other memory intensive operations) and for using system services with large resources without delays induced by reactive memory management of resources. For example, one or more parameters indicative of past usage of the application (e.g., average session duration) within a time period and/or of past usage of a resource (e.g., percentage usage of a system service with a resource) by the application within the time period can be tracked. In response to receiving a request to launch the application, in accordance with a determination that the one or more parameters satisfy one or more criteria, the resource in memory can be released. In response to receiving a request to launch the application, in accordance with a determination that the one or more parameters associated with the application fail to satisfy the one or more criteria the resource in memory can be kept. In some examples, the system service can be a keyboard and its resource can be a machine learning model for autocorrect, predictive text entry, etc.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Figure 1B:
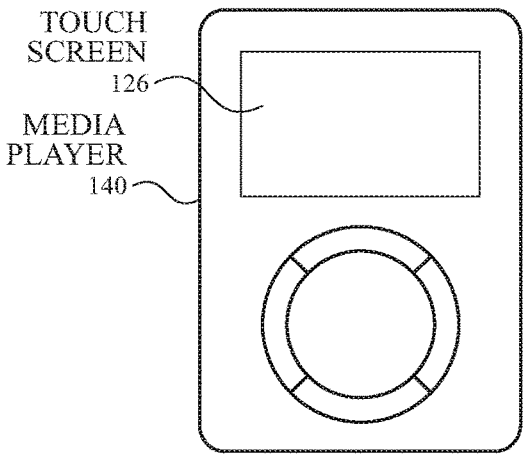
Figure 1C:
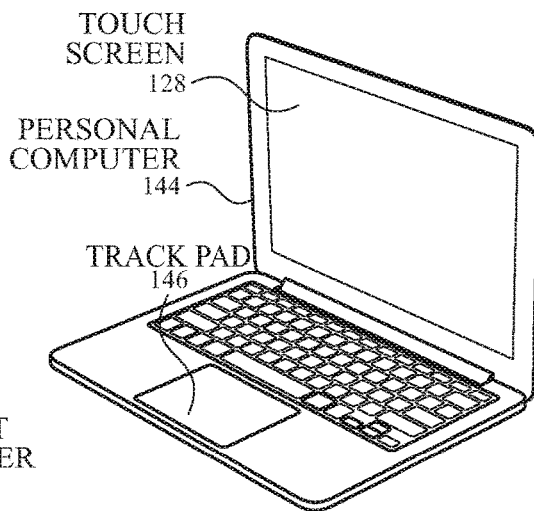
Figure 1D:
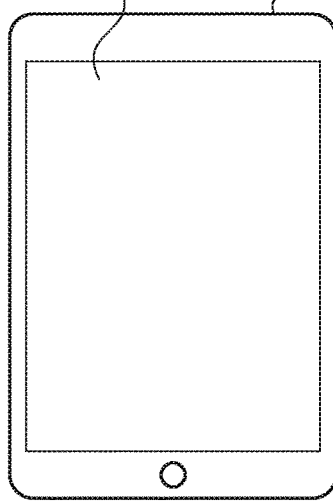
Figure 1E:
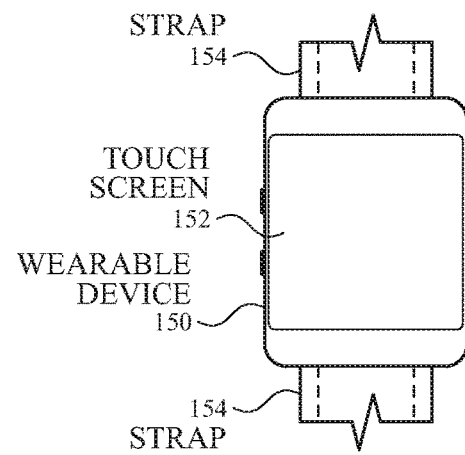

FIGS. 1A-1E illustrate exemplary devices, optionally including touch screens, that can include a data processing system and can perform user adaptive resource management according to examples of the disclosure. FIG. 1A illustrates an exemplary mobile telephone 136 that includes a touch screen 124 and can perform adaptive resource management according to examples of the disclosure. FIG. 1B illustrates an example digital media player 140 that includes a touch screen 126 and can perform adaptive resource management according to examples of the disclosure. FIG. 1C illustrates an example personal computer 144 that includes a touch screen 128 and a track pad 146, and can perform adaptive resource management according to examples of the disclosure. FIG. 1D illustrates an example tablet computing device 148 that includes a touch screen 130 and can perform adaptive resource management according to examples of the disclosure. FIG. 1E illustrates an example wearable device 150 (e.g., a watch) that includes a touch screen 152 and can perform user adaptive resource management according to examples of the disclosure. Wearable device 150 can be coupled to a user via strap 154 or any other suitable fastener. It should be understood that the exemplary devices illustrated in FIGS. 1A-1E are provided by way of example, and other types of devices can include the data processing system described herein and can perform adaptive resource management described herein. Additionally, although the devices illustrated in FIGS. 1A-1E include touch screens, in some examples, the devices may have a non-touch-sensitive display and may include other input devices than touch-sensitive surfaces (e.g., button, switches, etc.).

Figure 2A:
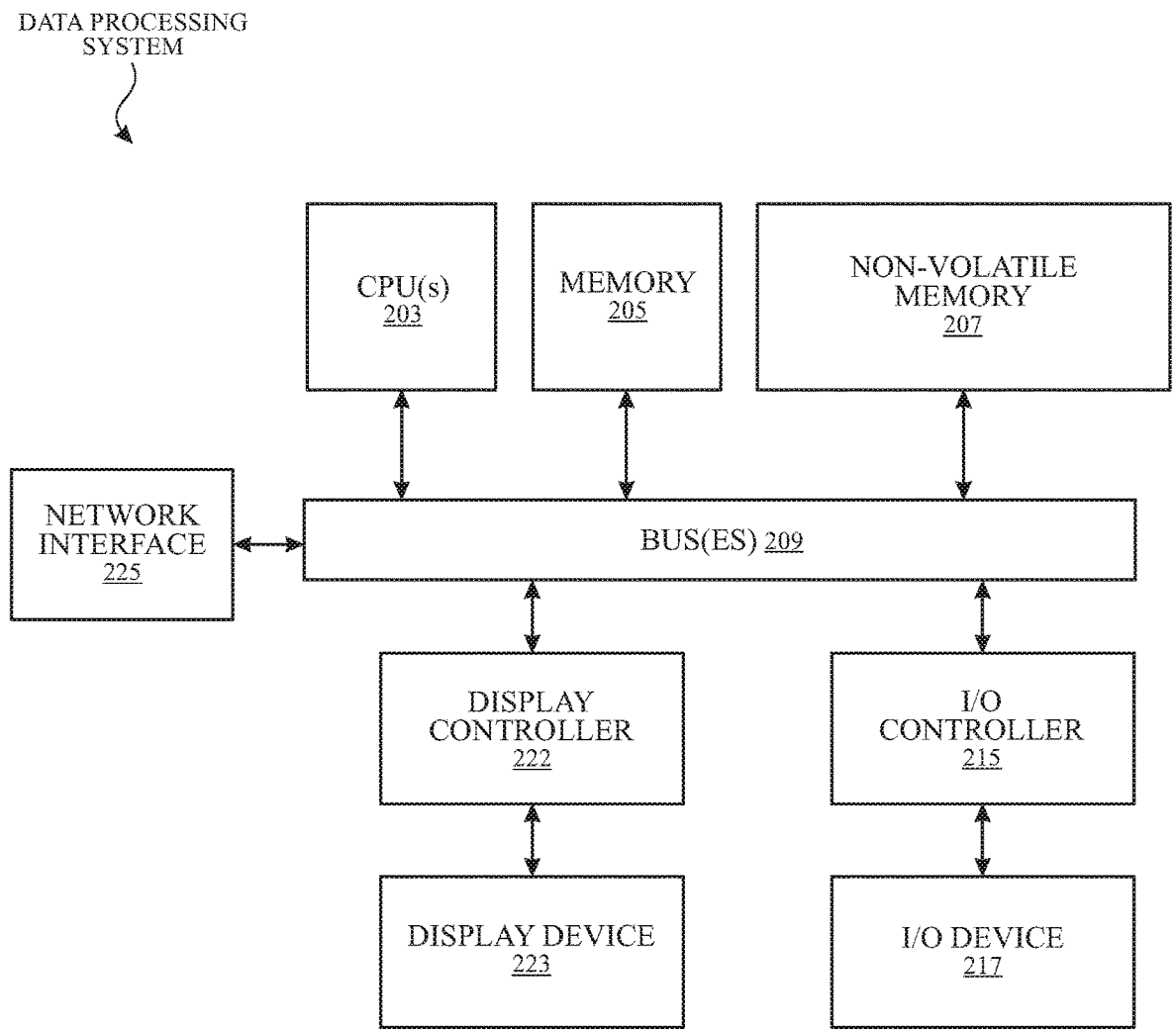
FIG. 2A illustrates a block diagram of an exemplary data processing system according to examples of the disclosure.

A data processing system can control the operations of a device (e.g., mobile telephone 136, digital media player 140, personal computer 144, tablet computing device 148, wearable device 150, etc.). FIG. 2A illustrates a block diagram of an exemplary data processing system according to examples of the disclosure. The data processing system 200 can include one or more buses 209, which serve to interconnect the various components of the system. One or more central processing units (CPUs) 203, which may include one or multiple cores (e.g., an efficiency core and a processing core) and one or more memory management units, can be coupled to the one or more buses 209. Examples disclosed herein can be used to manage allocations to memory 205. Memory 205 can include any type of memory including, but not limited to, volatile sequential DRAM, nonvolatile RAM, flash memory, phase change memory, or other types of volatile or nonvolatile semiconductor memory.

The data processing system 200 can also include nonvolatile memory 207, where data may be maintained after all power is removed from the data processing system 200. Exemplary nonvolatile memory 207 can include, but is not limited to, a hard disk drive, flash memory, a magnetic optical drive, magnetic memory, or an optical drive. Memory 205 and nonvolatile memory 207 can couple to the one or more buses 209 using one or more interfaces and connections.

The data processing system 200 can include one or more display controllers that can provide data to be displayed on one or more display devices. For example, FIG. 2A illustrates a display controller 222 can coupled to the bus(es) 209 to receive data to be displayed on a display device 223. The data processing system 200 can also include one or more input/output (I/O) controllers 215 that can provide interfaces for one or more I/O devices 217. Exemplary I/O devices 217 can include mice, touch screens, track pads, joysticks, styli, microphones, cameras, and other types of input devices. In some examples, the display controller 222 and a touch controller (e.g., I/O controller 215) can be integrated or otherwise operated together for controlling a touch screen (e.g., touch screens illustrated in FIGS. 1A-1E). Additionally, one or more network interfaces 225 can couple to the bus(es) 209 to provide access to one or more networks (not shown).

CPU(s) 203 can receive inputs from I/O devices 217 and perform actions based on the inputs. For example, communication between CPU 203 and a touch screen (e.g., display device 223 and I/O device 217) can be used to generate an image on the touch screen, such as an image of a user interface (UI), and can use the touch screen and/or its touch controller (e.g., I/O controller 215) to detect a touch on or near the touch screen, such as a touch input and/or force input to the displayed UI. The touch input can be used by computer programs stored in memory 205 and/or non-volatile memory 207 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. As discussed herein, CPU 203 can also perform other functions including memory management, and particularly, user adaptive memory management.

Note that one or more of the functions described herein can be performed by executed by CPU(s) 203 from instructions stored in program storage (e.g. memory 205 and/or non-volatile memory 207). The instructions can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

It is to be understood that data processing system 200 is not limited to the components and configuration of FIG. 2A, but can include other or additional components in multiple configurations according to various examples. Additionally, the components of data processing system 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2A.

Figure 2B:
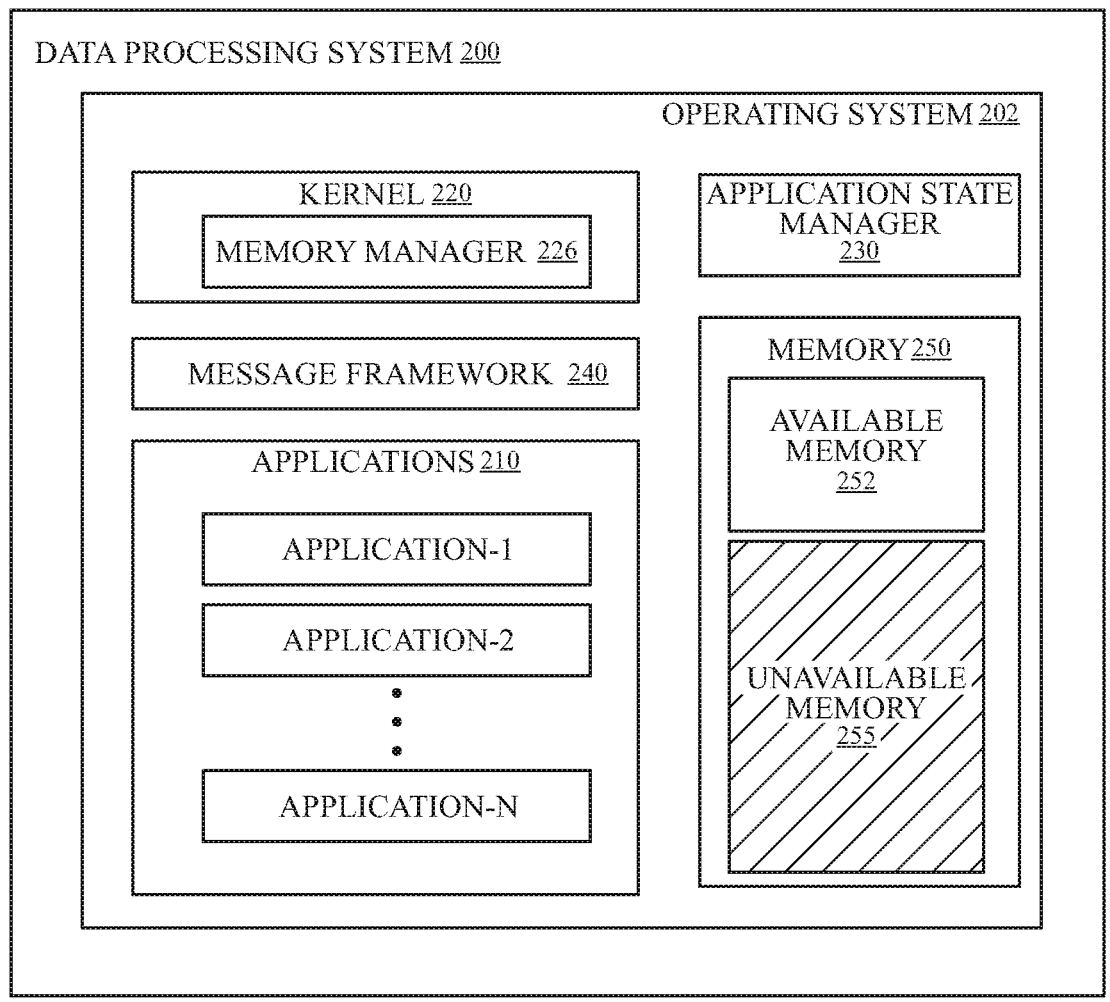
FIG. 2B illustrates a block diagram of an exemplary software architecture of the data processing system according to examples of the disclosure.

The description provided herein can be embodied, at least in part, in software. That is, examples of the disclosure (e.g., regarding memory management, and particularly of user adaptive memory management) can be carried out in a data processing system 200 in response to its processor(s) (e.g., CPU(s) 203) executing a sequence of instructions. FIG. 2B illustrates a block diagram of an exemplary software architecture (and a partial hardware view showing certain hardware components) of the data processing system 200 according to examples of the disclosure. In some examples, non-transitory memory (e.g., memory 205, non-volatile memory 207, or a combination thereof) can include the software instructions for execution by a CPU 203 of the data processing system 200.

In some examples, hardware circuitry can also be used in combination with software instructions to implement the examples of the disclosure. For example, the hardware circuitry can be embedded within various components of the hardware of the data processing system 200 (e.g., CPUs 203, display controller 222, I/O controller 215, etc.). Thus, the examples of the disclosure are not limited to any specific combination of hardware circuitry and software or to any particular source for the instructions executed by the data processing system.

FIG. 2B illustrates a block diagram of one example of data processing system 200 (e.g., that can be implemented in a device such as mobile telephone 136, digital media player 140, personal computer 144, tablet computing device 148, wearable device 150, server, personal digital assistant, gaming device, or any other device that can execute multiple processes) that can perform user adaptive resource management. As illustrated in FIG. 2B, data processing system 200 can include an operating system 202 that is a set of software used to manage device hardware resources and provides common services for other running computer programs, such as application programs. The exemplary operating system 202 includes a kernel 220, an application state manager 230, and a message framework 240. The operating system 202 manages several applications 210 and physical memory 250 (e.g., memory 205 and/or non-volatile memory 207).

In one example, the operating system 202 manages several running applications 210 by scheduling a processor (e.g., CPU 203) of the data processing system 200 to execute each of the running applications. As illustrated in FIG. 2B, the applications 210 include several applications 1–N. In one example, the operating system 202 manages the physical memory 250 by keeping track of the status of each memory location, either unavailable or free. The operating system 202 determines how memory is allocated among competing processes, deciding which processes gets memory, when the processes receive the memory, and how much memory each process is allowed. When memory is allocated, the operating system 202 determines which memory locations will be assigned. The operating system 202 tracks when memory is freed or unallocated and updates the status. As illustrated in FIG. 2B, the physical memory 250 can include available physical memory 252 and unavailable physical memory 255.

In one example, an application is a process that is an instance of an application program that is being executed. In this example, the application may be an application program that is executing as a result of user input. In another example, an application is a thread that is the smallest sequence of programmed instructions that can be managed independently by an operating system scheduler. In one example, a thread is contained inside a process. Multiple threads can exist within the same process and share resources such as memory, while different processes may not share these resources.

The kernel 220 can include a memory manager 226 to coordinate memory allocation for running applications, such as applications 210, based on limited available physical memory in data processing system 200. Memory manager 226 may monitor an overall status of memory usage of the data processing system 200, e.g., periodically, continuously or on demand. In one example, memory manager 226 can update memory usage status with a current status of memory usage for data processing system 200, e.g. based on a level of physical memory consumption, a ratio derived from sizes of available and used physical memory, or other applicable values. Memory manager 226 may directly perform memory allocation/de-allocation operations at kernel level and/or ask selected applications to perform application specific memory management operations at user level. Thus, memory manager 226 can work cooperatively with applications 210 to maintain stability of memory usage within data processing system 200, e.g., keeping relevant values in memory usage status within a preconfigured range.

In FIG. 2B, and in one example, the kernel 220 handles the management of physical memory 250 and manages the state of the applications 210. In another example, the kernel 220 handles memory management using the memory manager 226, and the application state manager 230 handles the state of the applications 210. In one example, the application state manager 230 determines a state in which the application is in (e.g., foreground application, background media application, shared screen foreground application, etc.), and sends the state information to the memory manager 226. In one example, the memory manager 226 performs memory management by using a hierarchy of resource management techniques with dynamic resource policies. In one example, the hierarchy of resource management techniques represents a sequence or a priority of applying different resource management techniques, which may include a system that tracks process memory usage and kills processes and/or applications based on memory usage, virtual memory compression, purging memory, and memory warnings at specific thresholds. An example of some of these memory management techniques is described in U.S. Patent Application No. 62/514,927, titled "METHOD AND APPARATUS FOR MANAGING KERNEL MEMORY OF DATA PROCESSING SYSTEMS" by Lionel D. Desai, et al., which is incorporated herein by reference in entirety for all purposes.

Freezing is application swapping or page out, i.e. memory pages belonging to a particular application are chosen and elected to be moved to a non-volatile memory (e.g., non-volatile memory 207) or a compressed virtual memory (VM). In one example, frozen pages can be moved to an uncompressed, fixed-size file on non-volatile NAND flash memory. The compressed VM can be a compressed region within main volatile memory (e.g., memory 205). The compressed VM compresses the data of pages fed to it and keeps that compressed data in main volatile memory for easy decompression when needed. In one example, the memory manager 226 can ensure that the application's data is sent out in homogenous compressed segments, i.e., the memory manager 226 can make sure that there is no mingle of compressed data between different applications.

Purgeable memory is a region of memory that, when marked as unneeded by a process, can be reclaimed quickly and efficiently by the operating system 202. An efficient way to free memory rapidly without killing an application is to purge some purgeable memory. For example and in one example, if an application is nearing a threshold (e.g., 80%) of its assigned memory consumption limit, its volatile purgeable memory is reclaimed. If after reclaiming its purgeable memory, the application is still above the threshold (e.g., 80%) of the memory consumption limit, a memory pressure notification is then sent to the application to reduce its footprint. In this manner, an application using purgeable memory is not penalized.

In one example, the priorities used to terminate applications can be applied to reclaim purgeable memory. When the memory manager 226 tries to reclaim memory on the system, it can purge memory from applications by terminating applications in a priority order. This will ensure that foreground applications have a better chance of keeping their cached state because foreground applications are usually the last application to be terminated.

In one example, purgeable footprint accounting can be revamped in the following ways: (1) volatile memory is not included in an application's footprint; (2) the entire virtual size of a non-volatile purgeable memory region will count against an application's footprint; and (3) the resident size of a non-volatile purgeable memory region will count against an application's footprint. This accounting can be more honest for foreground applications that make heavy use of purgeable memory so that they are not penalized for regions that they have already returned to the system.

In one example, the memory manager 226 intelligently selects applications for page out to NAND non-volatile memory. The memory manager 226 of one example hides the page out latency and uses the page out budget effectively. The memory manager 226 identifies the ideal candidate applications for page out to NAND non-volatile memory, i.e., applications the user is likely to use again. The memory manager 226 performs page out early enough to avoid severe memory pressure. In one example, once an application's data has been swapped to NAND non-volatile memory, the memory manager 226 has reclaimed all the memory it could at that point. If the memory manager 226 terminates that application later on, the operating system 202 has not only gained zero additional free pages from the swapped image but it has also wasted NAND cycles. Therefore, in one example, the memory manager 226 enhances the process of tracking memory usage and terminating processes and application to be aware of page out operations.

Applications 210 and memory manager 226 may listen to messages routed by message framework 240, e.g., the Grand Central Dispatch (GCD), to communicate with each other asynchronously. In one example, kernel 220 may detect system-wide memory pressure and alert user space processes such as applications 210. Message framework 240 may asynchronously alerts clients, such as applications 210, of kernel events caused by changes in memory usage status.

In addition to the memory management described above, kernel 220 and/or memory manager 226 can implement user adaptive memory management techniques or processes, described in more detail below. User adaptive memory management can allow an electronic device including a data processing system to efficiently, proactively, and selectively allocate memory resources (particularly to keep or release large resources in memory), which improves application launch times for some applications and reduces or prevents delays from loading resources into memory for system services. User adaptive resource management thereby improves the user experience.

In particular, some system services—services provided by an operating system (e.g., operating system 202) rather than by a specific application (e.g., one of applications 210)—(e.g., keyboard, handwriting, or dictation features in applications such as iMessage or Mail available from Apple, Inc.) require one or more resources (e.g., machine learning models for autocorrect, predictive text, noun-adjective declension, etc. for keyboard input, converting freehand touch input or images into characters, or converting audio signals into text) that may use large allocations of memory (e.g., above a threshold amount of memory, where the threshold can be 10 MB of memory, 50 MB of memory or 100 MB of memory, for example). Loading a resource into memory when the system service is activated (e.g., when the keyboard, handwriting or dictation features are launched) can result in a poor user experience due to the time needed to load the resources (e.g., large machine learning models) from storage (e.g., non-volatile memory 207) into memory (e.g., memory 205). Keeping the resource in memory when the system service deactivated results in the allocated memory being unavailable, which can reduce application load time for some applications, particularly when memory is scarce (e.g., the system is within a threshold amount of its memory limit) and/or for applications that require a large amount of memory for resources but do not use the large resource for the system service much or at all (e.g., gaming applications). The system of tracking process memory usage and terminating processes/applications based on memory usage can be used to release memory (e.g., by terminating/closing applications or processes that are not in use), but this reactive process takes time to release memory, which can cause the application to launch more slowly than when sufficient memory is available. User adaptive memory management can track past use of one or more applications and/or one or more system services (requiring one or more resources) by one or more users. A heuristic can be used to determine when to keep resources in memory and when to release resources in an adaptive way to improve user performance for launching applications (or other memory intensive operations) and for using system services with large resources without delays induced by reactive memory management of resources.

Figure 3:
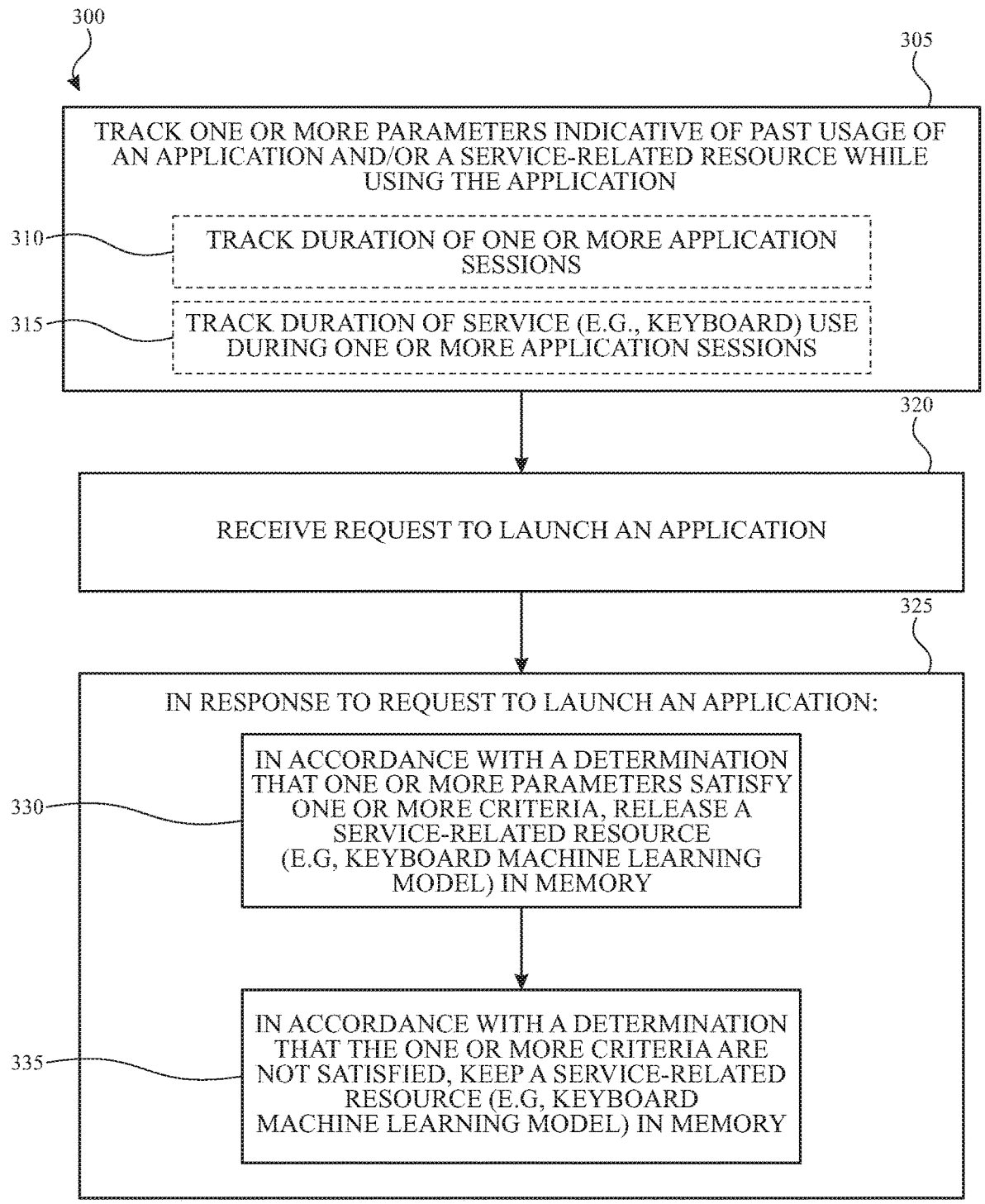
FIG. 3 illustrates an exemplary process for adaptive resource management according to examples of the disclosure.

FIG. 3 illustrates an exemplary process 300 for adaptive resource management according to examples of the disclosure. In some examples, the data processing system (e.g., data processing system 200 and/or memory manager 226) tracks (305) one or more parameters indicative of past usage of one or more applications and/or past usage of one or more system service-related resources while using the one or more applications. In some examples, the system tracks (310) the duration of each session of one or more applications during a time period (e.g., a sliding window). The time period can be of an empirically determined duration (e.g., 12 hours, 24 hours, 2 days, 4 days, 1 week, etc.) that can balance storage considerations for the tracked data (e.g., a larger window requires more memory) with stability considerations (e.g., a shorter window may result in different behavior due to anomalous short term behavior, such as differences between weekend use versus weekday use). A session defines a use of an application from activation to deactivation of an application. In some examples, the session can begin when an application is launched or switched to (or otherwise displayed on the display as an active, foreground application) and can end when the application is closed or switched away from (or no longer displayed on the display as an active application). The duration of a session can be tracked and/or recorded for each session of one or more applications during the window (e.g., by a daemon). For example, the time of activation and time of deactivation can be tracked, and when the application is deactivated (closed or switched away from) the duration of the session parameter can be stored (e.g., in memory 250) based on the times of activation/deactivation (or based on a timer). In some examples, the system can compute and/or track an average session duration for the one or more applications. In some examples, the system can store durations for each session. In some examples, the system aggregates durations across sessions for each of the applications.

In some examples, the one or more parameters can include a parameter indicative of a number of sessions of each of the one or more applications within the window. In some examples, the parameter can be a binary parameter, indicative of no sessions of a particular application or indicative of one or more sessions of a particular application (but not indicative of the precise number of sessions). The binary parameter can be tracked for multiple applications.

In some examples, the system tracks (315) the duration of use of a system service during sessions of the one or more applications during the window. In some examples, the system service can be a keyboard using a large memory resource (e.g., a high quality machine learning model), and the duration of use of the keyboard can be measured. For example, the duration of use of the keyboard/machine learning model can be estimated based on the time at which the keyboard using the large memory resource is launched and the time at which the keyboard using the large memory resource is closed. The duration of use of the system service/large memory resource can be tracked and/or recorded for each session of one or more applications during the window (e.g., by a daemon). For example, the time of activation and time of deactivation of the keyboard can be tracked, and when the keyboard is deactivated (closed or switched away from) the keyboard use parameter can be stored (e.g., in memory 250) based on the times of activation/deactivation (or based on a timer). In some examples, the system can differentiate between use of a system service requiring the resources (e.g., using a keyboard for text entry) from use of the system service that do not require the resources (e.g., using a keyboard for password or pin entry). In some examples, only the former use of the system service that requires the resource may contribute to the tracked duration of service/resource use at 315. The system service/resource use parameter can be stored individually, aggregated for each session of an application or aggregated across sessions of an application. In some examples, the system can compute and/or track a percentage use parameter of the system service/memory resource (percentage user parameter) for the one or more applications. In some examples, the percentage use parameter for a system service and application can be computed by dividing the aggregated duration of use of the system service/resource across all sessions of the application by the aggregated duration of the sessions of the application within the window. In some examples, the percentage use parameter for a system service and application can be computed separately for each session in the window and an average can be computed for the window.

In some examples, the data processing system receives (320) a request to launch an application. The request to launch an application can occur by opening an application (e.g., actuating an icon for the application displayed on a touch screen) or by switching between applications to bring the application to be launched to the foreground.

In response to the request to launch the application (325), in accordance with a determination that the one or more parameters satisfy one or more criteria, the data processing system releases (330) a resource (e.g., a service-related resource) in memory. For example, the one or more parameters (e.g., aggregated across sessions and/or resource use within the window) can satisfy the one or more criteria when, at launch of the application, there is a sufficiently low probability (e.g., less than a threshold) that the large resource will be used for the system service. As a result, releasing the resource in memory can improve application loading time where the use of the resources is heuristically determined to be unlikely. In response to the request to launch the application (325), in accordance with a determination that the one or more parameters fail to satisfy the one or more criteria, the data processing system keeps (330) a resource (e.g., a service-related resource) in memory. For example, the one or more parameters (e.g., aggregated across sessions and/or resource use within the window) can fail to satisfy the one or more criteria when, at launch of the application, there is an insufficiently low probability (e.g., greater than a threshold) that the large resource will be used for the system service. As a result, keeping the resources in memory can prevent degradation of user experience by resource loading delays where the use of the resources are heuristically determined to be somewhat likely. The heuristics based on the tracked parameters and criteria can be selected and/or set to improve the user experience. For example, the criteria can be set such that the adaptive memory management is biased toward keeping system service resources in memory, in some examples, where the delay in loading large resources into memory can be larger than the delay due to the process to terminate applications/processes to free up memory for launching an application. Exemplary criteria are described in more detail below with reference to FIG. 4.

Although process 300 triggers keeping or releasing a resource in memory on a user request to launch an application, other triggers are possible in some examples. For example, activating a memory intensive sub-application or service within an already launched application may trigger an evaluation of whether to keep or release a system service resource in memory. In some examples, after a threshold period (e.g., 1 minute, 3 minutes, 5 minutes, 10 minutes, etc.) of disuse of a system service within an application session, the associated large memory resource can be released to memory without evaluating the remaining parameters and criteria. Additionally, in some examples, releasing the large resource in memory can refer to releasing the resource entirely (e.g., removing a machine learning model from the volatile memory). In some examples, releasing the large resource in memory can refer to replacing the large resource in memory with a smaller, less robust resource in memory. For example, in some examples, a high-quality machine learning model for auto-correction and predictive text can be released in memory and replaced with a low-quality machine learning model for auto-correction and/or predictive text. Likewise, when the system service (e.g., keyboard) is activated while the machine learning resource is not loaded in memory, a quick-loading, low-quality machine learning model can be loaded first and used until the larger high-quality machine learning model can be loaded to reduce the delay before the machine learning feature becomes available.

The adaptive resource management described above also provides an agile system for memory management with the ability to release system service-associated resources into memory without terminating the system service process itself. For example, the process of tracking process memory usage and terminating processes/applications based on memory usage may identify the keyboard process for termination in order to release the memory resources. In contrast, in some examples, process 300 provides the ability to release the memory resources (e.g., a high-quality machine learning model) associated with a system service (e.g., a keyboard), without terminating the system service process entirely.

Figure 4:
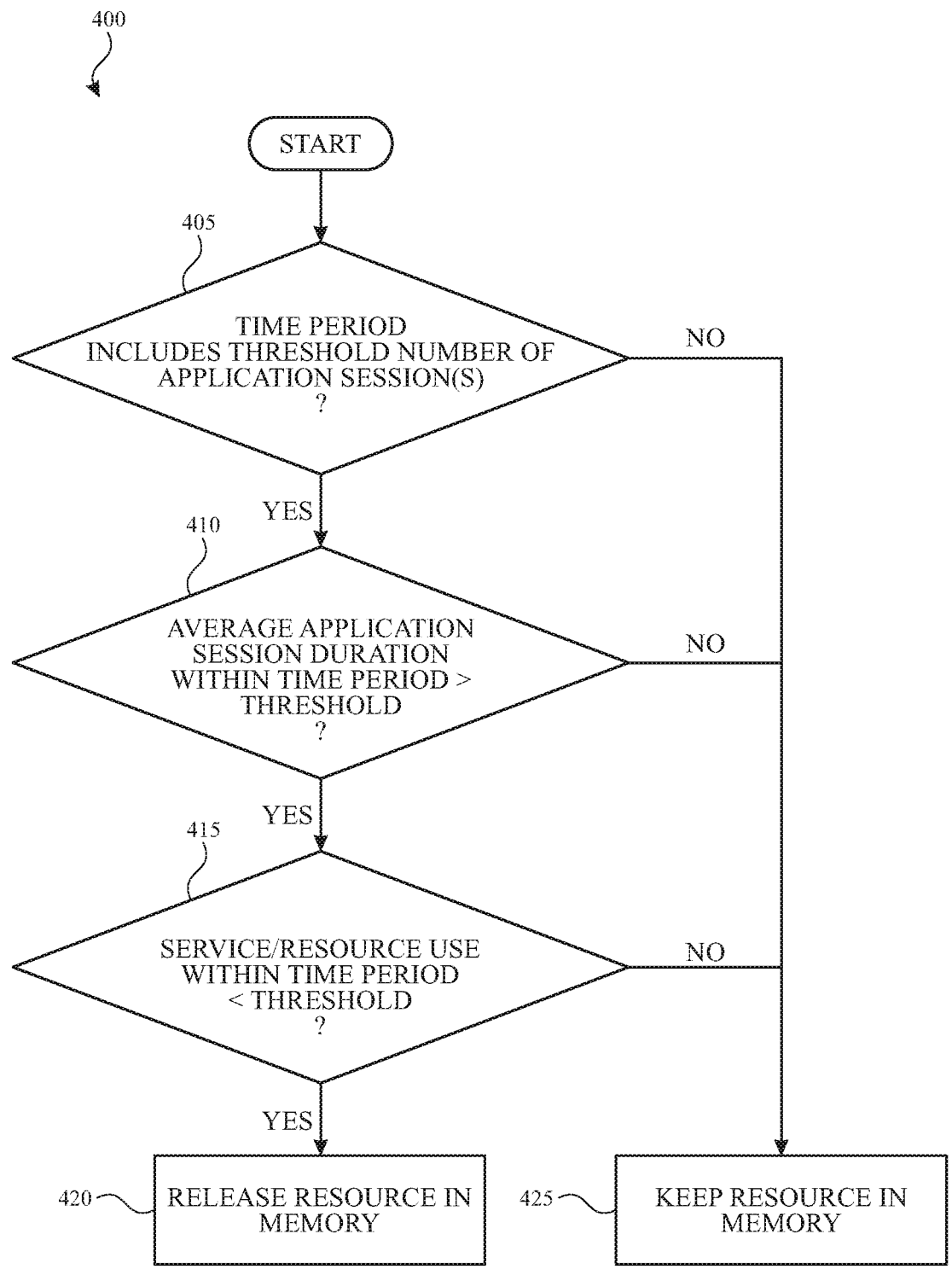
FIG. 4 illustrates an exemplary process for adaptive resource management based on one or more tracked parameters and one or more criteria according to examples of the disclosure.

FIG. 4 illustrates an exemplary process 400 for adaptive resource management based on a determination of whether one or more tracked parameters satisfy one or more criteria according to examples of the disclosure. In some examples, the data processing system (e.g., data processing system 200 and/or memory manager 226) tracks three parameters: a first parameter indicating whether one or more application sessions occurred within a time period (e.g., window); a second parameter indicative of application session duration(s) (e.g., an average application session duration) within the time period; and a third parameter indicative of service-related resource use (e.g., a percentage of service-related resource use) within the time period. The one or more parameters can be tracked for each application (e.g., each application installed on the electronic device including the data processing system). In the example of FIG. 4, each of these three tracked parameters is evaluated against a corresponding threshold for an application to be launched (e.g., after receiving a request to launch an application at 320) for the window (e.g., a time period immediately preceding the request to launch the application).

In some examples, the data processing system determines (405) whether a threshold number of sessions of the application occurred within the window. For example, the first parameter indicative of one or more prior sessions of the application to be launched within the time period is evaluated with a first criterion that is satisfied when a threshold number of sessions of the application occurred within the time period. In some examples, the threshold can be one session, such that the first criterion is satisfied when at least one session of the application occurred within the window. In such an example, it may be possible to replace this first parameter with average session duration parameter and replace the first criterion with different criterion that evaluates whether the average duration is non-zero (i.e., a zero average duration within the window is indicative that there were no application sessions within the window). In some examples, the threshold can be greater than one (e.g., two, three, etc.)

In some examples, the data processing system determines (410) whether an average session duration of sessions of the application that occurred within the window is greater than a threshold. For example, the second parameter indicative of an average session duration of the application to be launched within the time period is evaluated with a second criterion that is satisfied when the average session duration of the application within the window is greater than a threshold. The threshold can be set to avoid frequent releasing and reloading of resources that can be detrimental to user experience when a user frequently switches between applications. In some examples, the threshold can be set between 1-10 minutes (e.g., 2 minutes, 3 minutes, 5 minutes, 8 minutes). The threshold can be determined empirically to improve user experience across usage patterns.

In some examples, the data processing system determines (415) whether usage of the resource associated with the system service for the application that occurred within the window is less than a threshold. For example, a third parameter indicative of a percentage of usage of the resource during each session of the application within the time period is evaluated with a third criterion that is satisfied when the percentage of usage of the resource during each session of the application within the time period is less than a threshold. The threshold can be set to avoid releasing of resources when the historical usage of the resource indicates a sufficient likelihood that the resource may be used during the session. The percentage of usage parameter can be calculated by dividing a duration of use of a system service using the resource (e.g., time of display of a keyboard using a high-quality machine learning model) within the time period by the duration of each session of the application with the time period. In some examples, the threshold can be set between 1%-25% (e.g., 5%, 10%, 15%, 20%, etc.). The threshold can be determined empirically to improve user experience across usage patterns.

In the example of FIG. 4, the data processing system releases (420) the large memory resource when each of the criteria is satisfied. For example, when the window includes information regarding a threshold number of sessions (e.g., at least one prior session) of the application to be launched, the average session duration of the application to be launched is above the threshold, and the percentage of usage of the resource associated with the system service is below a threshold, the data processing system releases the resource in memory. Under these circumstances, with each of the criteria satisfied, the system can make a heuristic determination that the likelihood of requiring the resource can be sufficiently low (e.g., below a heuristic threshold) such that improvements to launch speed of the application can be made without degrading the user experience much, if at all, to reload the resource into memory when subsequently needed by the system service. In contrast, in any of the criteria is not satisfied, the data processing system keeps (425) the resource in memory. Under these circumstances, with at least one of the criteria not satisfied, the system can make a heuristic determination that the likelihood of requiring the resource can be sufficiently high (e.g., above a heuristic threshold) such that degradation of the user experience due to loading the resources in memory outweigh the improvements in the user experience due to improved application launch speed.

In some examples, fewer, more, or different parameters can be tracked and fewer more or different criteria can be used to determine whether to release or keep a resource in memory. For example, rather than track and evaluate a criterion for average session duration, a maximum session duration, minimum session duration, mode session duration, or weighted average of session durations that can be evaluated against a corresponding session duration criterion. Likewise, rather than a percentage of resource use for the application within the window, resource use can be measured for each session and an average percentage of resource use (or a minimum, maximum, mode, weighted average of resource use) can be tracked and evaluated against a corresponding resource usage criterion.

Figure 5A:
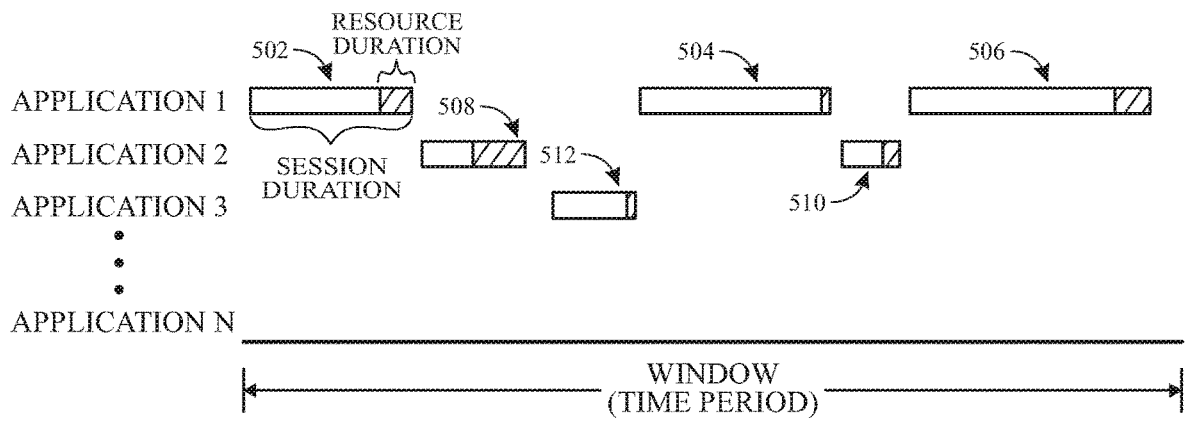
FIG. 5A illustrates an exemplary graphical representation of tracked parameters for applications during a time period according to examples of the disclosure.

FIG. 5A illustrates an exemplary graphical representation of tracked parameters for applications during a time period (e.g., window) according to examples of the disclosure. As illustrated in FIG. 5A, measured parameters for each of Applications 1-N can include a session duration and a service-related resource use duration. The session duration is represented by a rectangle with a start point indicative of the session start time and the end point indicative of the session end time. The service-related resource use duration is represented by the shaded region of the session rectangle, and for ease of illustration, does not necessarily correspond to the start and end time of the service/resource use. The measured parameters can be tracked and/or used to generate other tracked parameters. For example, an average session duration can be computed by averaging the session duration for each application session within the window. For example, the durations of sessions 502, 504 and 506 can be averaged to determine an average session duration for Application 1, and the durations of sessions 508 and 510 can be averaged to determine an average session duration for Application 2. For applications with a single session, such as Application 3 with session 512, the average session duration can simply be the duration of session 512. For applications without a session in the window, such as Application N, the average session duration can be zero. As another example, the percentage usage of the service-associated resource can be computed by dividing the total duration of service-associated resource use (e.g., the sum of the shaded regions) by the total duration of the sessions (e.g., the sum of the session rectangles) for each application within the window. In some examples, a number of sessions can be tracked for each application (3 sessions for Application 1, 2 sessions for Application 2, 1 session for Application 3, 0 sessions for Application N).

At the time of launch of an application, the data processing system can keep or release the service-associated resource in memory based on the parameters tracked for the corresponding application in the time period/window. For example, in response to the launch of Application N for the window of FIG. 5A, the data processing system implementing process 400 can keep the resource in memory because there are fewer than the threshold number (for a threshold of one) of sessions within the window (at the evaluation of the first parameter/criterion at 405). In contrast, in response to the launch of any of Applications 1-3, each of which includes at least one session within the window, the data processing system implementing process 400 may keep or release the resource in memory (subject to the evaluation of the second and third parameters/criteria) because there are at least the threshold number (for a threshold of one) of sessions within the window (at the evaluation of the first parameter/criterion at 405).

Turning to the second criterion, in response to the launch of Application 3 for the window of FIG. 5A, the data processing system implementing process 400 can keep the resource in memory because the average session duration is less than the threshold (at the evaluation of the second parameter/criterion at 410). In contrast, in response to the launch of Application 1 or Application 2, each of which has an average session duration above the threshold within the window, the data processing system implementing process 400 may keep or release the resource in memory (subject to the evaluation of the third parameter/criterion) because the second parameter/criterion is satisfied at 410.

Turning to the third criterion, in response to the launch of Application 2 for the window of FIG. 5A, the data processing system implementing process 400 can keep the resource in memory because the service-related resource usage is greater than the threshold (at the evaluation of the third parameter/criterion at 415). In contrast, in response to the launch of Application 1 (e.g., a gaming application with little or no use for a keyboard system service with a machine learning model), which has a service/resource usage below the threshold within the window, the data processing system implementing process 400 may release the resource in memory because the first, second and third parameters/criteria are satisfied at 405, 410 and 415).

Figure 5B:
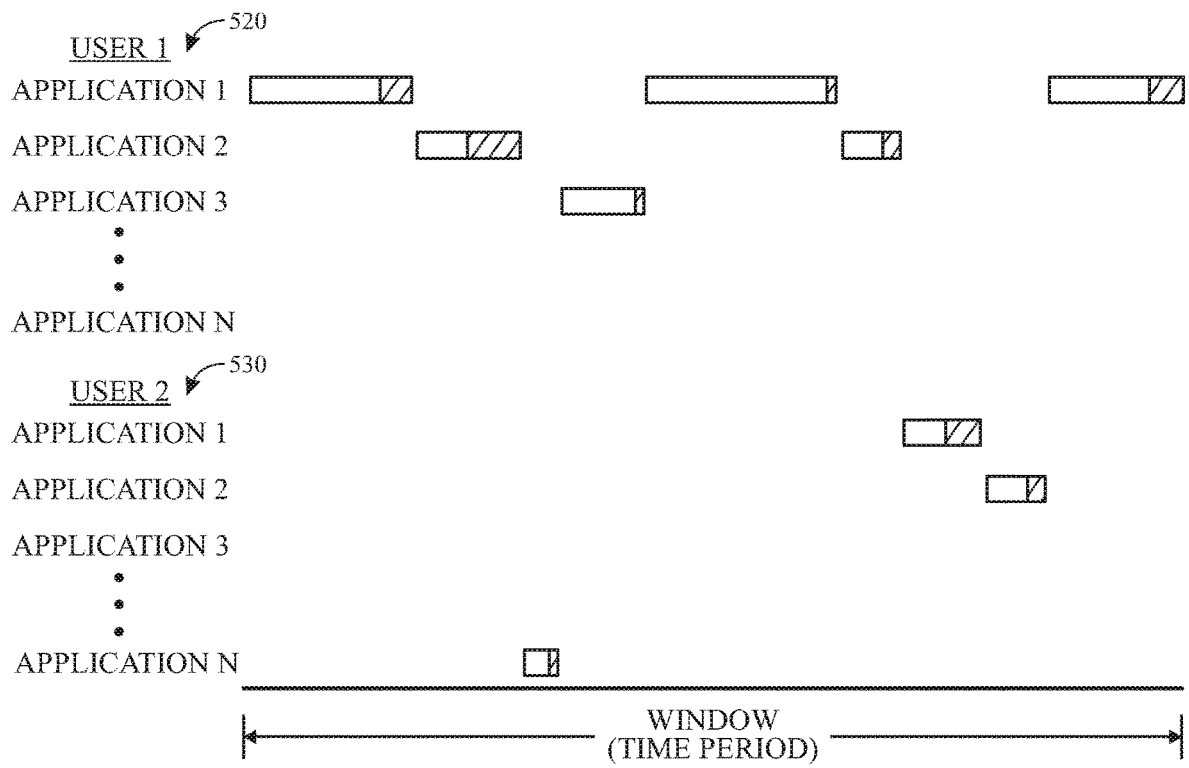
FIG. 5B illustrates an exemplary graphical representation of tracked parameters for applications for different users during a time period according to examples of the disclosure.

In some examples, the tracking of parameters and determining whether to keep or release a memory resource can be performed for a device (e.g., irrespective of the various users of the device). In some examples, the tracking of parameters and determining whether to keep or release a memory resource can be performed based on a user. For example, data processing system 200 can be a multi-user data processing system in which one or more users may access applications using a user interface provided by an operating system 202. Such a data processing system can track parameters unique to each user of the electronic device/data processing system. In some examples, the use can be differentiated based on different user accounts (e.g., Apple ID). In response to a request to launch an application by a particular user, the tracked parameters associated with the user can be used to determine whether to release or keep memory resources based on the user-specific past application usage and service-related resource usage. FIG. 5B illustrates an exemplary graphical representation of tracked parameters for applications for different users during a time period (e.g., window) according to examples of the disclosure. The representation of FIG. 5B uses a similar convention as FIG. 5A to represent durations of use of the sessions/resources, but tracks the parameters separately for different users (e.g., a first user 520 and a second user 530).

The discussion above primarily focuses on one system service and one resource. It should be understood, however, than in addition to tracking an application session parameter and a resource use parameter on a per application basis (and optionally a per user basis), the tracking can also be separately performed for one or more system services and one or more resources. For example, a keyboard system service could be associated with more than one high-quality machine learning model representing different languages (e.g., one model for English, one for Chinese, one for German, etc.). Additional heuristics can also be used, in some examples, to determine whether to keep or release one or more resources. For example, a language of an incoming message can be used to determine which resource to keep in memory and which resource(s) to release in memory (e.g., keep the resource for the language matching the incoming message and release the remaining keyboards).

In some examples, parameters can be separately tracked and evaluated for different system services. For example, first parameters can be tracked for a keyboard system service with a corresponding high-quality machine learning model and second parameters can be tracked for a dictation system service with a corresponding high-quality machine learning model for converting audio into text. The tracked parameters the corresponding criteria may be the same or different depending on the type of system service and/or the type of resource.

As described above, one aspect of the present technology is the gathering and use of data available from specific and legitimate sources (e.g., tracking application and/or system service use via one or more daemons) to improve memory management. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to provide user adaptive memory management tailored to particular users. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user adaptive memory management, the present technology can be configured to allow users to select to "opt in" or "opt out" of participation in the collection of personal information data during registration for services or anytime thereafter. In another example, users can select not to provide application and/or system service use information for user adaptive memory management. In yet another example, users can select to limit the length of time application and/or system service use information is maintained or entirely block the collection of application and/or system service use information for user adaptive memory management. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user adaptive memory management can be based on aggregated non-personal information data or a bare minimum amount of personal information, such duration of application use and/or duration of system service use only on the user's device or other non-personal information.

Therefore, according to the above, some examples of the disclosure are directed to a method. In some examples, the method can be performed at an electronic device in communication with a display (e.g., display device 223) and one or more input devices (e.g., I/O devices 217). The method can comprise tracking one or more parameters associated with an application indicative of past usage of the application within a time period and of past usage of a resource by the application within the time period, receiving a request to launch the application, and in response to receiving the request to launch the application, in accordance with a determination that the one or more parameters associated with the application satisfy one or more criteria, releasing the resource in a memory, and in accordance with a determination that the one or more parameters associated with the application fail to satisfy the one or more criteria, keeping the resource in the memory. Additionally or alternatively to one or more of the examples disclosed above, in some examples, the one or more parameters can comprise a parameter indicative of one or more sessions of the application within the time period, and the one or more criteria can include a criterion that is satisfied when at least a threshold number of sessions of the application occurred within the time period. Additionally or alternatively to one or more of the examples disclosed above, in some examples, the one or more parameters can comprise a parameter indicative of an average session duration of the application within the time period, and the one or more criteria can include a criterion that is satisfied when the average session duration of the application within the time period is greater than a threshold. Additionally or alternatively to one or more of the examples disclosed above, in some examples, the one or more parameters can comprise a parameter indicative of a percentage of usage of the resource during each session of the application within the time period, and the one or more criteria can include a criterion that is satisfied when the percentage of usage of the resource during each session of the application within the time period is less than a threshold. Additionally or alternatively to one or more of the examples disclosed above, in some examples, the parameter indicative of the percentage of usage of the resource during each session of the application within the time period can be calculated by dividing a duration of display of a keyboard within the time period by the duration of each session of the application with the time period. Additionally or alternatively to one or more of the examples disclosed above, in some examples, the resource can comprises a machine learning model for a keyboard service. Additionally or alternatively to one or more of the examples disclosed above, in some examples, the one or more parameters associated with the application can be tracked separately for each user of the electronic device. Some examples of the disclosure are directed to a non-transitory computer readable storage medium. The non-transitory computer readable storage medium can store instructions, which when executed by one or more processors, cause the one or more processors to perform any of the above methods.

Some examples of the disclosure are directed to a system. In some examples, the system can be an electronic device in communication with a display (e.g., display device 223) and one or more input devices (e.g., I/O devices 217). The system can comprise a memory and a processor. The processor can be configured to track one or more parameters associated with an application indicative of past usage of the application within a time period and of past usage of a resource by the application within the time period, receive a request to launch the application, and in response to receiving the request to launch the application, in accordance with a determination that the one or more parameters associated with the application satisfy one or more criteria, release the resource in a memory, and in accordance with a determination that the one or more parameters associated with the application fail to satisfy the one or more criteria, keep the resource in the memory. Additionally or alternatively to one or more of the examples disclosed above, in some examples, the one or more parameters can comprise a parameter indicative of one or more sessions of the application within the time period, and the one or more criteria can include a criterion that is satisfied when at least a threshold number of sessions of the application occurred within the time period. Additionally or alternatively to one or more of the examples disclosed above, in some examples, the one or more parameters can comprise a parameter indicative of an average session duration of the application within the time period, and the one or more criteria can include a criterion that is satisfied when the average session duration of the application within the time period is greater than a threshold. Additionally or alternatively to one or more of the examples disclosed above, in some examples, the one or more parameters can comprise a parameter indicative of a percentage of usage of the resource during each session of the application within the time period, and the one or more criteria can include a criterion that is satisfied when the percentage of usage of the resource during each session of the application within the time period is less than a threshold. Additionally or alternatively to one or more of the examples disclosed above, in some examples, the parameter indicative of the percentage of usage of the resource during each session of the application within the time period can be calculated by dividing a duration of display of a keyboard within the time period by the duration of each session of the application with the time period. Additionally or alternatively to one or more of the examples disclosed above, in some examples, the resource can comprises a machine learning model for a keyboard service. Additionally or alternatively to one or more of the examples disclosed above, in some examples, the one or more parameters associated with the application can be tracked separately for each user of the electronic device.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method comprising:
    tracking one or more parameters associated with an application indicative of past usage of the application within a time period and of past usage of a resource by the application within the time period, wherein the time period occurs prior to a request to launch the application and within a threshold period of time of receiving the request to launch the application;
    receiving the request to launch the application; and
    in response to receiving the request to launch the application:
        in accordance with a determination that the one or more parameters associated with the application satisfy one or more criteria, releasing the resource in a memory; and
        in accordance with a determination that the one or more parameters associated with the application fail to satisfy the one or more criteria, keeping the resource in the memory.

2. The method of claim 1, wherein the one or more parameters comprise a parameter indicative of one or more sessions of the application within the time period, and wherein the one or more criteria include a criterion that is satisfied when at least a threshold number of sessions of the application occurred within the time period.

3. The method of claim 1, wherein the one or more parameters comprise a parameter indicative of an average session duration of the application within the time period, and wherein the one or more criteria include a criterion that is satisfied when the average session duration of the application within the time period is greater than a threshold.

4. The method of claim 1, wherein the one or more parameters comprise a parameter indicative of a percentage of usage of the resource during each session of the application within the time period, and wherein the one or more criteria include a criterion that is satisfied when the percentage of usage of the resource during each session of the application within the time period is less than a threshold.

5. The method of claim 4, wherein the parameter indicative of the percentage of usage of the resource during each session of the application within the time period is calculated by dividing a duration of display of a keyboard within the time period by the duration of each session of the application with the time period.

6. The method of claim 1, wherein the resource comprises a machine learning model for a keyboard service.

7. The method of claim 1, wherein the one or more parameters associated with the application are tracked separately for each user of an electronic device.

8. A system comprising:
    a memory;
    a processor coupled to the memory configured to:
        track one or more parameters associated with an application indicative of past usage of the application within a time period and of past usage of a resource by the application within the time period, wherein the time period occurs prior to a request to launch the application and within a threshold period of time of receiving the request to launch the application;
        receive the request to launch the application; and
        in response to receiving the request to launch the application:
            in accordance with a determination that the one or more parameters associated with the application satisfy one or more criteria, release the resource in the memory; and
            in accordance with a determination that the one or more parameters associated with the application fail to satisfy the one or more criteria, keep the resource in the memory.

9. The system of claim 8, wherein the one or more parameters comprise a parameter indicative of one or more sessions of the application within the time period, and wherein the one or more criteria include a criterion that is satisfied when at least a threshold number of sessions of the application occurred within the time period.

10. The system of claim 8, wherein the one or more parameters comprise a parameter indicative of an average session duration of the application within the time period, and wherein the one or more criteria include a criterion that is satisfied when the average session duration of the application within the time period is greater than a threshold.

11. The system of claim 8, wherein the one or more parameters comprise a parameter indicative of a percentage of usage of the resource during each session of the application within the time period, and wherein the one or more criteria include a criterion that is satisfied when the percentage of usage of the resource during each session of the application within the time period is less than a threshold.

12. The system of claim 11, wherein the parameter indicative of the percentage of usage of the resource during each session of the application within the time period is calculated by dividing a duration of display of a keyboard within the time period by the duration of each session of the application with the time period.

13. The system of claim 8, wherein the resource comprises a machine learning model for a keyboard service.

14. The system of claim 8, wherein the one or more parameters associated with the application are tracked separately for each user of the system.

15. A non-transitory computer readable storage medium storing instructions, which when executed by an electronic device including a memory and one or more processors, cause the one or more processors to perform a method, the method comprising:
    tracking one or more parameters associated with an application indicative of past usage of the application within a time period and of past usage of a resource by the application within the time period, wherein the time period occurs prior to a request to launch the application and within a threshold period of time of receiving the request to launch the application;
    receiving the request to launch the application; and
    in response to receiving the request to launch the application:

in accordance with a determination that the one or more parameters associated with the application satisfy one or more criteria, releasing the resource in the memory; and in accordance with a determination that the one or more parameters associated with the application fail to satisfy the one or more criteria, keeping the resource in the memory.

16. The non-transitory computer readable storage medium of claim 15, wherein the one or more parameters comprise a parameter indicative of one or more sessions of the application within the time period, and wherein the one or more criteria include a criterion that is satisfied when at least a threshold number of sessions of the application occurred within the time period.

17. The non-transitory computer readable storage medium of claim 15, wherein the one or more parameters comprise a parameter indicative of an average session duration of the application within the time period, and wherein the one or more criteria include a criterion that is satisfied when the average session duration of the application within the time period is greater than a threshold.

18. The non-transitory computer readable storage medium of claim 15, wherein the one or more parameters comprise a parameter indicative of a percentage of usage of the resource during each session of the application within the time period, and wherein the one or more criteria include a criterion that is satisfied when the percentage of usage of the resource during each session of the application within the time period is less than a threshold.

19. The non-transitory computer readable storage medium of claim 18, wherein the parameter indicative of the percentage of usage of the resource during each session of the application within the time period is calculated by dividing a duration of display of a keyboard within the time period by the duration of each session of the application with the time period.

20. The non-transitory computer readable storage medium of claim 15, wherein the resource comprises a machine learning model for a keyboard service.

21. The non-transitory computer readable storage medium of claim 15, wherein the one or more parameters associated with the application are tracked separately for each user of the electronic device.

22. The non-transitory computer readable storage medium of claim 15, wherein the resource is a model utilized by a system service provided by an operating system to be loaded into a memory and consumes an amount of the memory.

23. The non-transitory computer readable storage medium of claim 15, the method further comprising:
tracking one or more second parameters associated with the application indicative of past usage of the application within a second time period and of past usage of the resource by the application within the second time period;

receiving a second request to launch the application; and in response to receiving the second request to launch the application:
in accordance with a determination that the one or more second parameters associated with the application satisfy the one or more criteria, releasing the resource in the memory; and in accordance with a determination that the one or more second parameters associated with the application fail to satisfy the one or more criteria, keeping the resource in the memory.

24. The method of claim 1, further comprising:
tracking one or more second parameters associated with the application indicative of past usage of the application within a second time period and of past usage of the resource by the application within the second time period;

receiving a second request to launch the application; and in response to receiving the second request to launch the application:
in accordance with a determination that the one or more second parameters associated with the application satisfy the one or more criteria, releasing the resource in the memory; and in accordance with a determination that the one or more second parameters associated with the application fail to satisfy the one or more criteria, keeping the resource in the memory.

25. The system of claim 8, wherein the processor is further configured to:
track one or more second parameters associated with the application indicative of past usage of the application within a second time period and of past usage of the resource by the application within the second time period;

receive a second request to launch the application; and in response to receiving the second request to launch the application:
in accordance with a determination that the one or more second parameters associated with the application satisfy the one or more criteria, release the resource in the memory; and in accordance with a determination that the one or more second parameters associated with the application fail to satisfy the one or more criteria, keep the resource in the memory.

* * * * *